United States Patent Office 3,248,296
Patented Apr. 26, 1966

3,248,296
EPOXY-ORGANO SILICON COMPOUNDS AS HAIR TREATING AGENTS
Hans-Horst Steinbach, Leverkusen, Klaus Damm, Cologne-Flittard, and Walter Simmler, Cologne-Mulheim, Germany, assignors to Farbenfabriken Bayer Aktiengesellschaft, Leverkusen, Germany, a German corporation
No Drawing. Filed Mar. 29, 1963, Ser. No. 269,148
Claims priority, application Germany, Apr. 6, 1962, F 36,485
7 Claims. (Cl. 167—87)

ether, silicon-linked substances, of the following formula can be obtained, for example, wherein:

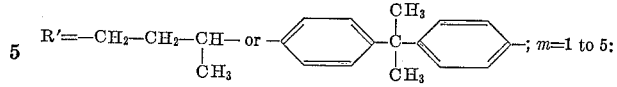

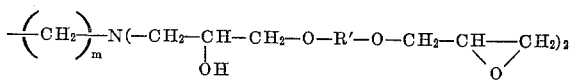

and

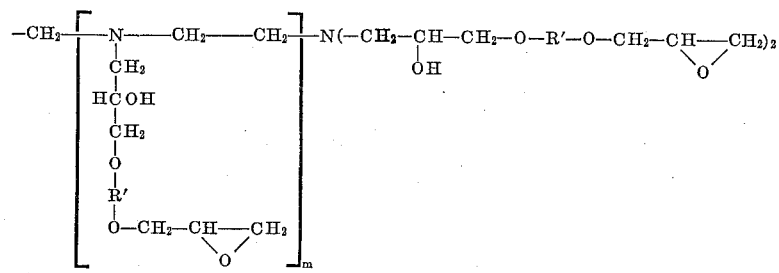

The invention relates to a treatment of human hair, the purpose of which is that the hair, particularly after it has been curled or waved with known agents, will keep its shape for a long time even under the influence of moisture.

For this treatment according to the invention there is put onto the hair an epoxy organo siloxane of the general formula $$R_nSiO_{\frac{4-n}{2}}$$

wherein $n$ is a numerical value greater than 1.9 and has a maximum of 3. Of the individual substituents R at least one is an epoxidised, C—Si— linked organic radical, i.e., containing the epoxide group

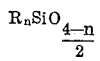

the others being methyl radicals which may be replaced to a small extent by hydrogen or C—Si— linked optionally also esterified polyether radicals. The epoxidised organic radicals can also contain the epoxide group several times so that up to 7 epoxide groups can be connected through organic radicals with one silicon atom. For every 100 silicon atoms the siloxane employed should contain at least one epoxide group, and in general at the most 250.

The epoxidised organo siloxanes can be produced in various ways not claimed herewith. For example, alkenyl silicon compounds can be oxidised with peracetic acid to epoxy alkyl silicon compounds, or partially substituted siloxanes can be added with their —HSi— groups to the double bonds of olefinic epoxides, e.g., epoxybutene or allyl glycidyl ether, to obtain for example silicon-linked organic radicals of the formula

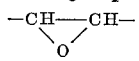

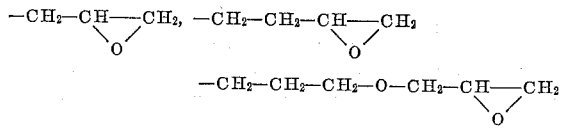

Furthermore amino alkyl or polyamino alkyl or -arylsiloxanes can be reacted with polyepoxides in such proportions that part of the epoxide groups remain unchanged. Thus by using butane diol-(1,3)-diglycidyl ether or 4,4′-dioxydiphenyldimethylmethane-diglycidyl The C—Si—linked polyether radicals which the siloxanes to be used according to the invention can contain, besides the epoxidised organic radicals and the methyl radicals, correspond for example to the formulae

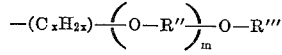

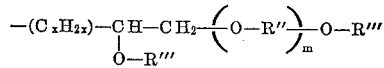

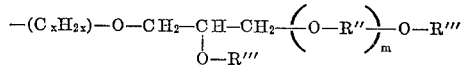

In this formula $x$ is a whole number from 1 to 3, $m$ is a whole number from 1 to 20, each individual group —O—R″— is ethylene oxide or propylene oxide, each individual radical R‴ is hydrogen, lower alkyl or carboxyl.

These optionally esterified polyether radicals increase the solubility in water and alcohols. They can be introduced into siloxanes rich in epoxide groups, for example, by causing polyalkylene glycols to react with some of the epoxide groups or by adding siloxanes with HSi— groups on to olefinic polyethers in such a way that some of these groups at first remain over which are then added onto olefinic epoxide groups, or as described in detail in copending application Serial No. 205,558, filed June 27, 1962, in the name of Walter Simmler and Hans-Werner Kauczor, which application has been assigned to the assignee of this case by reacting polyalkylene glycols with bromomethyl siloxanes in such a way that part of the bromo methyl radicals are initially retained, and these are then reacted with amines or polyamines, and the amino groups, as already described, are finally caused to react with polyepoxides. The forementioned application is now U.S. 3,174,987 patented on March 23, 1965.

The epoxy organo siloxane can be employed according to the invention as the substance itself or as a solution, for example in water, ethanol, or methylene chloride. The effect of the hair treatment can be demonstrated as follows:

A curl is formed in known manner by rolling a lock of human hair on a commercial curler, impregnating it with an aqueous solution of 6% by weight of thioglycollic acid and 4% by weight of ethanolamine, heating for half an hour at 50° C., then thoroughly rinsing with water, dipping for 5 minutes into an aqueous solution of 3% by weight of hydrogen peroxide, rinsing again and drying at 60° C. The lock of hair taken off the curler and now spiral shaped, is thoroughly moistened with one of the treating agents specified in the following examples, the curl is dried for half an hour at 60° C. and subjected to the following test:

The lock of hair is moistened with water, a 5 gram-weight is fastened to one end and at the other end it is fixed to hang freely in a heated cabinet, and the hair thus loaded is again dried at 60° C. If the siloxane application is omitted, the dried and unloaded lock of hair has lost its spiral form after this treatment and is quite straight. The hair treated according to the invention, on the other hand, is covered with an elastic film which protects it from the penetration of water without making the hairs stick to each other.

The following examples are given for the purpose of illustrating the invention.

*Example 1*

An ethyl alcoholic solution of 1% by weight of an epoxy organo siloxane is used which is produced from 2985 grams of a siloxane of the composition

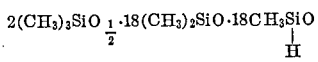

and 2690 grams of allylglycidyl ether in the presence of 5 grams of a catalyst of aluminium oxide (according to Brockmann) with 2% by weight of platinum deposited thereon, and exhibits a content of 16.3% by weight of the group

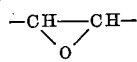

and 0.12% by weight of residual silicon-linked hydrogen.

A lock of hair treated with this solution in the manner described above has a silky sheen without appearing greasy. Under the straightening treatment described it substantially retains its shape.

*Example 2*

100 grams of the epoxy organo polysiloxane according to Example 1 is modified by heating it to 150° C. with 38 grams of a polyethylene glycol containing 8.7% by weight of OH— groups, and with 0.7 gram of anhydrous sodium hydroxide. Approximately half the epoxide groups introduced are thereby etherified with the polyethylene glycol. The product is soluble in water. If a lock of hair is treated in the manner described, with an aqueous solution of 1% by weight of this polysiloxane product, this lock of hair substantially retains its shape also in the straightening experiment.

*Example 3*

An epoxy organo siloxane is used which is obtained in the following way:

12.6 grams of a commercial condensate of an ether of the formula

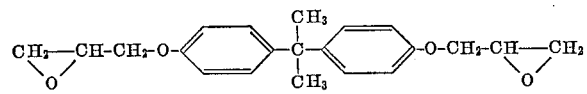

available under the registered trademark "Lekutherm X-20" as an epoxide resin precursor, is added to a solution of 10.6 grams of an aminoalkyl siloxane of the formula

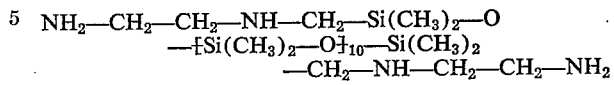

in 30 grams of methylene chloride so that the number of epoxide groups is double the number of nitrogen-linked hydrogen atoms of the siloxane used. The mixture is stirred for one hour at room temperature and then diluted with 2,000 grams of methylene chloride.

A lock of hair is treated with the solution obtained, in the manner described, with the result that the straightening experiment gives no noticeable alterations to the shape of the hair.

*Example 4*

The same results as in Example 3 are obtained by using the epoxy organo siloxane obtained in the following way:

19 grams of a diepoxide of the formula

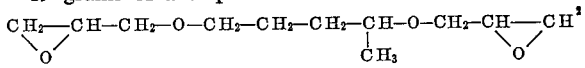

is added to a solution of 19 grams of an aminoalkyl siloxane of the formula

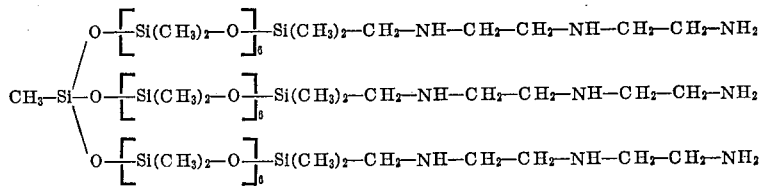

in 45 grams of methylene chloride, and the mixture is stirred for one hour at room temperature. It is then diluted with 3,500 grams of methylene chloride and this solution is applied as described in Example 3.

*Example 5*

The same stability of shape in the straightening experiment which is achieved in Examples 3 and 4 is attained with a product produced as follows:

An aminoalkyl siloxane ether of the formula

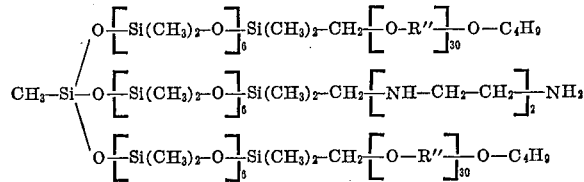

is used wherein $\{-O-R''-\}_{30}$ represents a polyalkylene oxide chain composed of equal parts by weight of ethylene oxide and propylene oxide. To a solution of 46 grams of this compound in 70 grams of methylene chloride, 6.5 grams are added of the same diepoxide as in Example 4, and the mixture is stirred for one hour at room temperature. The methylene chloride is then blown off at 30° C. with nitrogen and the remaining oil is dissolved in 5,200 grams of aqueous ethyl alcohol containing 70% by weight of ethanol. This solution is applied as described in the foregoing examples.

We claim:
1. A composition for increasing hair's stability of shape against the influence of moisture consisting essentially of a solution of approximately 1% by weight of an organo-polysiloxane in a diluent selected from the group consisting of water, ethanol, aqueous ethanol, and methylene chloride, said organo-polysiloxane having the formula

$$R_n SIO_{\frac{4-n}{2}}$$

wherein $n$ has a value of from 1.9 to and including 3, each R is a member selected from the group consisting of C—Si— bonded epoxy-organo selected from the group consisting of

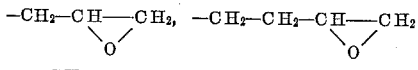
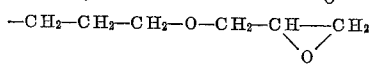
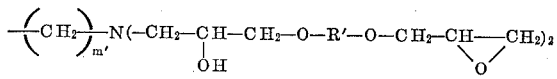

and

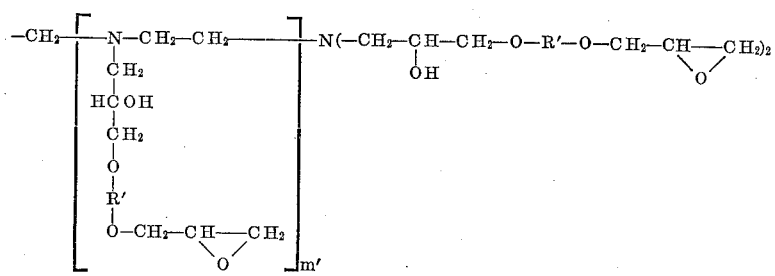

wherein $m'$ is a whole number from 1 to 5, inclusive, and R' is a member selected from the group consisting of

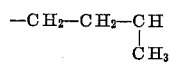

and

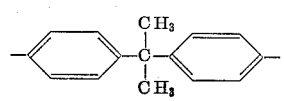

methyl, hydrogen, and C—Si-bonded polyether radicals having the formulas

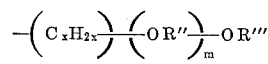
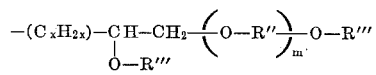

and

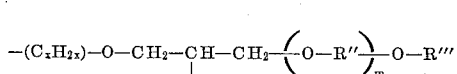

wherein $x$ is a whole number from 1 to 3, inclusive, $m$ is a whole number from 1 to 20, inclusive, R'' is alkylene having 2 to 3 carbon atoms, R''' is a member selected from the group consisting of hydrogen, alkyl having from 1 to 4 carbon atoms, and carboxyl, wherein said epoxy-organo group members have from 1 to 7 epoxide groups, the proportion of said epoxy organo-group members being such that the number of the epoxide groups to the number of silicon atoms contained in said organo-polysiloxane is in the ratio of 1:100 to 25:10.

2. A method of treating hair for increasing the hair's stability of shape against the influence of moisture, which comprises applying to the hair with the hair positioned in the arrangement in which it is desired to be stabilized a composition consisting essentially of a solution of approximately 1% by weight of an organo-polysiloxane in a diluent selected from the group consisting of water, ethanol, aqueous ethanol, and methylene chloride, said organo-polysiloxane having the formula $$R_nSiO_{\frac{4-n}{2}}$$

wherein $n$ has a value of from 1.9 to and including 3, each R is a member selected from the group consisting of C—Si— bonded epoxy-organo selected from the group consisting of

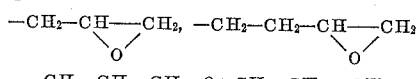
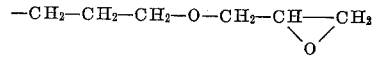

and

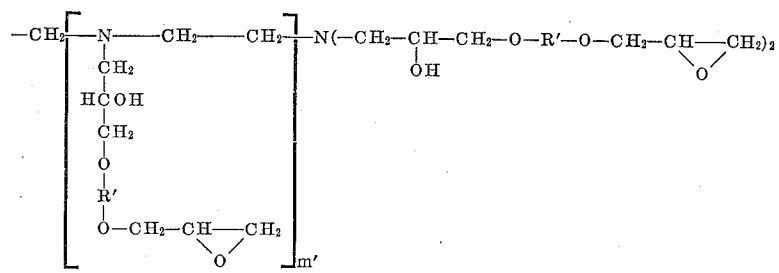

wherein $m'$ is a whole number from 1 to 5, inclusive, and R' is a member selected from the group consisting of

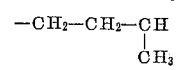

and

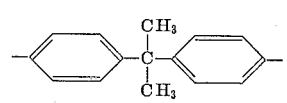

methyl, hydrogen, and C—Si— bonded polyether radicals having the formulas

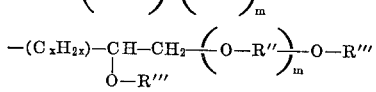

and

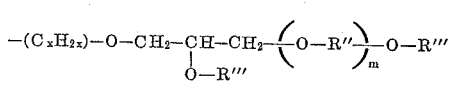

wherein $x$ is a whole number from 1 to 3, inclusive, $m$ is a whole number from 1 to 20, inclusive, R'' is alkylene having 2 to 3 carbon atoms, R''' is a member selected from the group consisting of hydrogen, alkyl having from 1 to 4 carbon atoms, and carboxyl, wherein said epoxy-organo group members have from 1 to 7 epoxide groups, the proportion of said epoxy organo-group members being such that the number of the epoxide groups to the number of silicon atoms contained in said organo-polysiloxane is in the ratio of 1:100 to 25:10, and then drying the hair with the composition thereon.

3. A composition for increasing hair's stability of shape against the influence of moisture consisting essentially of an ethanolic solution of 1% by weight of an epoxy organo-siloxane which is the reaction product of

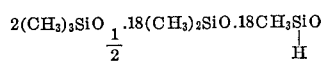

and allylglycidyl ether having a content of

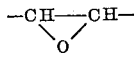

groups of 16.3% by weight and 0.12% by weight of residual silicon-linked hydrogen.

4. A composition for increasing hair's stability of shape against the influence of moisture consisting essentially of an aqueous solution of 1% by weight of an organo polysiloxane which is the reaction product of

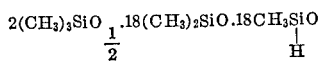

and a polyethylene glycol containing 8.7% by weight of OH groups so that half of the epoxide groups introduced are etherified with the polyethylene glycol.

5. A composition for increasing hair's stability of shape against the influence of moisture consisting essentially of a methylene chloride solution of approximately 1% by weight of an organo polysiloxane which is the reaction product of

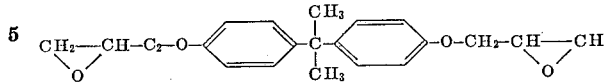

and

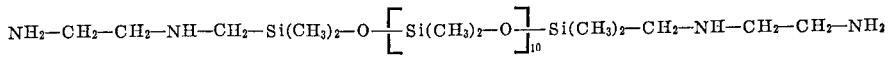

6. A composition for increasing hair's stability of shape against the influence of moisture consisting essentially of a methylene chloride solution of approximately 1% by weight of an organo polysiloxane which is the reaction product of

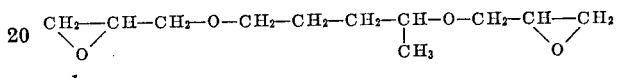

and

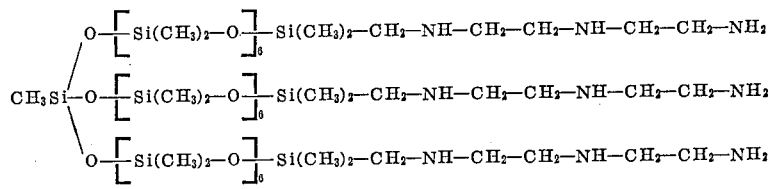

7. A composition for increasing hair's stability of shape against the influence of moisture consisting essentially of an ethanolic solution of approximately 1% by weight of an organo polysiloxane which is the reaction product of

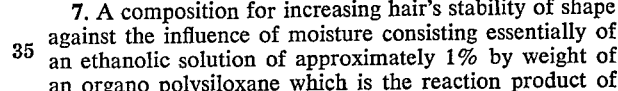 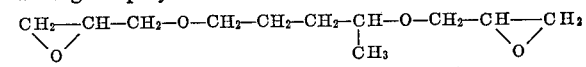

and

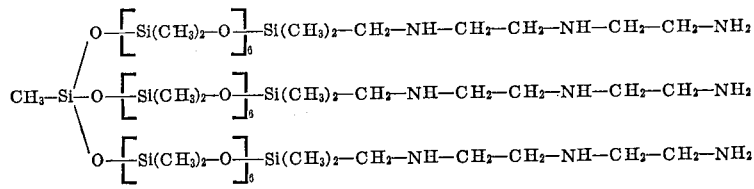

References Cited by the Examiner

UNITED STATES PATENTS

| | | | |
|---|---|---|---|
| 2,750,947 | 6/1956 | Gant | 167—87.1 XR |
| 2,970,150 | 1/1961 | Snyder | 260—348 |
| 3,061,519 | 10/1962 | Rosekrans | 167—87 |

FOREIGN PATENTS 1,061,321  7/1959  Germany.

JULIAN S. LEVITT, *Primary Examiner.*

FRANK CACCIAPAGLIA, JR., *Examiner.*